(12) United States Patent
Unten et al.

(10) Patent No.: US 12,517,491 B2
(45) Date of Patent: Jan. 6, 2026

(54) MACHINING SYSTEM, AND METHOD OF MANUFACTURING A MACHINED PRODUCT

(71) Applicant: Sumitomo Electric Sintered Alloy, Ltd., Takahashi (JP)

(72) Inventors: Masaki Unten, Takahashi (JP); Hiroaki Terai, Takahashi (JP); Senichi Sumi, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 362 days.

(21) Appl. No.: 18/278,625

(22) PCT Filed: Mar. 3, 2022

(86) PCT No.: PCT/JP2022/009058
§ 371 (c)(1),
(2) Date: Aug. 24, 2023

(87) PCT Pub. No.: WO2022/186321
PCT Pub. Date: Sep. 9, 2022

(65) Prior Publication Data
US 2024/0134338 A1  Apr. 25, 2024
US 2024/0231305 A9  Jul. 11, 2024

(30) Foreign Application Priority Data
Mar. 3, 2021 (JP) .................... 2021-033931

(51) Int. Cl.
*G05B 19/404* (2006.01)
*G05B 19/4065* (2006.01)

(52) U.S. Cl.
CPC ....... *G05B 19/404* (2013.01); *G05B 19/4065* (2013.01)

(58) Field of Classification Search
CPC .............. B23Q 17/0961; G05B 19/404; G05B 19/4065; G05B 2219/50205
See application file for complete search history.

(56) References Cited

U.S. PATENT DOCUMENTS

2006/0182451 A1\* 8/2006 Shoji ...................... G03G 15/55
399/24
2015/0369752 A1\* 12/2015 Honda ............... G01N 21/9501
356/237.2
(Continued)

FOREIGN PATENT DOCUMENTS

CN       103995229 A    8/2014
CN       206702766 U   12/2017
(Continued)

*Primary Examiner* — Scott T Baderman
*Assistant Examiner* — Mario M Velez-Lopez
(74) *Attorney, Agent, or Firm* — XSENSUS LLP (57) ABSTRACT

A machining system includes, a tool configured to machine a workpiece, a motor configured to rotate the tool or the workpiece, a controller configured to control the motor, a measurement device configured to acquire a load current of the motor, the controller is configured to change a rotational speed of the motor when a Mahalanobis distance exceeds a threshold, the Mahalanobis distance is a value determined by using a parameter based on the load current acquired by the measurement device in a specific machining range of the workpiece, and the parameter based on the load current includes a parameter obtained by performing Fourier transform on the load current and a measured value of the load current.

8 Claims, 6 Drawing Sheets

(56) References Cited

U.S. PATENT DOCUMENTS

| | | | | |
|---|---|---|---|---|
| 2017/0242076 A1* | 8/2017 | Yoshiura | ............ | G05B 23/0235 |
| 2017/0298814 A1* | 10/2017 | Kubo | ...................... | F02D 41/22 |
| 2018/0181106 A1* | 6/2018 | Sonoda | ............. | G05B 19/4065 |
| 2018/0203439 A1* | 7/2018 | Hattori | .................... | G06F 17/18 |
| 2022/0297251 A1 | 9/2022 | Unten | | |
| 2023/0175982 A1* | 6/2023 | Honda | ............... | G01N 21/9505 |
| | | | | 356/446 |

FOREIGN PATENT DOCUMENTS

| | | | | |
|---|---|---|---|---|
| JP | H04-176541 A | | 6/1992 | |
| JP | 2006-336078 A | | 12/2006 | |
| JP | 4184638 B2 | * | 11/2008 | ......... G05B 23/0283 |
| JP | 2020-038945 A | | 3/2020 | |
| JP | 2021-058966 A | | 4/2021 | |
| JP | 2021146564 A | * | 9/2021 | |
| WO | 2021/045014 A1 | | 3/2021 | |

* cited by examiner

MACHINING SYSTEM, AND METHOD OF MANUFACTURING A MACHINED PRODUCT

CROSS-REFERENCE TO RELATED APPLICATIONS

The present application is based on PCT filing PCT/JP2022/009058, filed Mar. 3, 2022, which claims priority to Japanese Patent Application No. 2021-033931, filed Mar. 3, 2021, the entire contents of each are incorporated herein by reference.

TECHNICAL FIELD

The present disclosure relates to a machining system and a method of manufacturing a machined product.

BACKGROUND ART

Patent Literature 1 discloses machining sintered parts. Cutting tools and grinding tools are used for machining.

PRIOR ART DOCUMENT

Patent Literature

PTL 1: Japanese Unexamined Patent Application Publication No. 2006-336078

SUMMARY OF THE INVENTION

A machining system of the present disclosure includes, a tool configured to machine a workpiece, a motor configured to rotate the tool or the workpiece, a controller configured to control the motor, a measurement device configured to acquire a load current of the motor. The controller is configured to change a rotational speed of the motor when a Mahalanobis distance exceeds a threshold, the Mahalanobis distance is a value determined by using a parameter based on the load current acquired by the measurement device in a specific machining range of the workpiece, and the parameter based on the load current includes a parameter obtained by performing Fourier transform on the load current and a measured value of the load current.

A method of manufacturing a machined product of the present disclosure includes, machining a workpiece with a tool while rotating the tool or the workpiece by a motor and measuring a load current of the motor by a measurement device. The machining changes a rotational speed of the motor when a Mahalanobis distance exceeds a threshold, the Mahalanobis distance is a value determined by using a parameter based on the load current acquired by the measurement device in a specific machining range of the workpiece, the parameter based on the load current includes a parameter obtained by performing Fourier transform on the load current and a measured value of the load current.

DETAILED DESCRIPTION

Problems to be Solved by Present Disclosure

A tool may be damaged during the process of machining a workpiece. When the tool is damaged, the predetermined machining cannot be performed on the next workpiece, and a defective product on which the predetermined machining is not performed by the tool is produced.

An object of the present disclosure to provide a machining system and method of manufacturing a machined product that can suppress the production of defective products.

Advantageous Effects of the Present Disclosure

The machining system of the present disclosure and the method of manufacturing a machined product of the present disclosure can suppress the production of defective products.

Description of Embodiments of the Present Disclosure

First, the contents of embodiments of the present disclosure will be listed and explained.

(1) A machining system according to an aspect of the present disclosure includes, a tool configured to machine a workpiece, a motor configured to rotate the tool or the workpiece, a controller configured to control the motor, a measurement device configured to acquire a load current of the motor. The controller is configured to change a rotational speed of the motor when a Mahalanobis distance exceeds a threshold, the Mahalanobis distance is a value determined by using a parameter based on the load current acquired by the measurement device in a specific machining range of the workpiece, and the parameter based on the load current includes a parameter obtained by performing Fourier transform on the load current and a measured value of the load current.

The above machining system can suppress production of defective products that are not subjected to predetermined machining by the tool. The machining system can immediately change the rotational speed of the motor when the Mahalanobis distance exceeds a threshold. In the present specification, the Mahalanobis distance may be referred to as an MD value. The case where the MD value exceeds the threshold refers to a case where a defective product is produced as will be described in detail later. That is, the machining system can change the rotational speed of the motor immediately after the defective product is produced.

(2) In the above machining system, a parameter obtained by performing Fourier transform on the load current may include an effective value of a value obtained by performing Fourier transform on the load current, an amplitude value of a peak in a Fourier spectrum obtained by performing Fourier transform on the load current, a center of gravity of an amplitude of the peak, and a center of gravity of an amplitude of a peak in a specific frequency range of the Fourier spectrum.

The above embodiment can suppress the production of defective products.

(3) The above machining system, the measured value of the load current include a maximum value of the load current, and an effective value of the load current.

The above embodiment can suppress the production of defective products.

(4) The above machining system, the number of the parameter based on the load current may be seven parameters including a first parameter to a seventh parameter, the first parameter to the fifth parameter may be parameters obtained by performing Fourier transform on the load current, and the sixth parameter and the seventh parameter may be measured values of the load current.

The embodiment can suppress the production of defective products.

(5) In the machining system according to (4), the first parameter may be an effective value of a value obtained by performing Fourier transform on the load current, the second parameter may be an amplitude value of a peak in a Fourier spectrum obtained by performing Fourier transform on the load current, the third parameter may be a center of gravity of an amplitude of the peak, the fourth parameter may be a center of gravity of an amplitude of a peak in a range of 28 Hz to 30 Hz of the Fourier spectrum, the fifth parameter may be a center of gravity of an amplitude of a peak in a range of 31 Hz to 33 Hz of the Fourier spectrum, the sixth parameter may be a maximum value of the load current, and the seventh parameter may be an effective value of the load current.

The embodiment can suppress the production of defective products.

(6) In the machining system, the specific machining range may be a range including a portion where a machining condition using the tool changes.

In the machining process of one workpiece, at a point where the machining condition by the tool changes, a unique change occurs in the load current acquired by the measurement device. By focusing on this specific change, it is easy to determine whether or not the MD value exceeds the threshold. Therefore, the production of the defective product can be detected with high accuracy by focusing on the specific change. The point where the machining condition by the tool changes will be described later.

(7) In the machining system, the machining system may have a multi-spindle lathe, and the tool may be a turning tool equipped in the multi-spindle lathe.

In a multi-spindle lathe, since a plurality of workpieces are machined substantially simultaneously, vibrations associated with machining of other workpieces propagate to the vibrometer as disturbances. Therefore, it is impossible to appropriately determine whether defective products are produced or not by the MD value based on vibration. On the other hand, the load current of the motor associated with the machining of each workpiece is acquired from different measurement devices. Furthermore, unlike vibrations, the load currents per motor are not affected by each other. Therefore, since the machining system uses the MD value obtained by using the first parameter to the seventh parameter based on the load current to determine whether or not the defective product is produced, it is possible to appropriately determine whether defective products are produced or not even in the case of the multi-spindle lathe.

(8) A method of manufacturing a machined product of the present disclosure includes, machining a workpiece with a tool while rotating the tool or the workpiece by a motor and measuring a load current of the motor by a measurement device. The machining changes a rotational speed of the motor when a Mahalanobis distance exceeds a threshold, the Mahalanobis distance is a value determined by using a parameter based on the load current acquired by the measurement device in a specific machining range of the workpiece, the parameter based on the load current includes a parameter obtained by performing Fourier transform on the load current and a measured value of the load current.

The above method of manufacturing a machined product can suppress the production of defective products. This is because the method of manufacturing a machined product can immediately change the rotational speed of the motor when a defective product is produced, like the machining system described above.

DETAILS OF EMBODIMENTS OF THE PRESENT DISCLOSURE

The details of embodiments of the present disclosure are described below with reference to the drawings. The same reference numerals in the drawings denote the same components.

Embodiment

Figure 1:
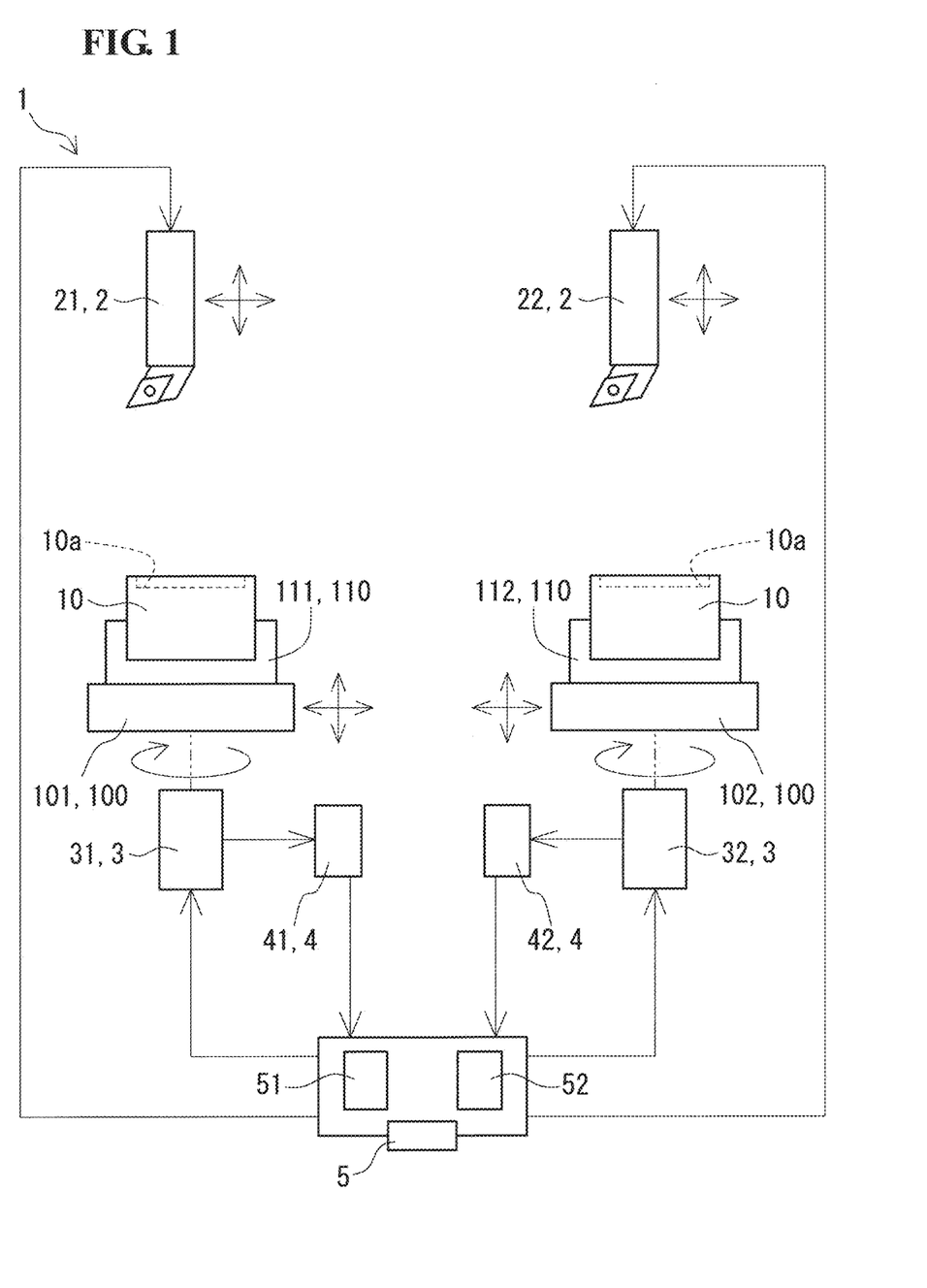
FIG. 1 is an explanatory diagram showing a machining system according to an embodiment.

[Machining System]
Referring to FIGS. 1 to 5, a machining system 1 according to an embodiment will be described. As shown in FIG. 1, machining system 1 of the embodiment of the present disclosure includes a tool 2, a motor 3, a measurement device 4, and a controller 5. Tool 2 machines a workpiece 10. Motor 3 rotates tool 2 or workpiece 10. Measurement device 4 acquires the load current of motor 3. Controller 5 controls motor 3. One of the features of machining system 1 of the embodiment of the present disclosure is that controller 5 changes the rotational speed of motor 3 when the MD value of workpiece 10 currently being machined exceed a threshold. Machining system 1 of the embodiment of the present disclosure, sequentially machines a plurality of workpieces 10. That is, machining system 1 of the embodiment of the present disclosure machines each of the plurality of workpieces 10 one by one in sequence.

[Workpiece]
Workpiece 10 is a machining object to be machined by tool 2. Workpiece 10 of FIG. 1 is shown in simplified form. The material, type, and shape of workpiece 10 are not particularly limited and can be selected as appropriate. Workpiece 10 is typically made of metal, resin, or ceramic. An example of metal is pure iron, iron alloy, or non-ferrous metal. An example of non-ferrous metal is copper, copper alloy, aluminum, or aluminum alloy. The type of workpiece 10 is, for example, a green compact, a sintered body, a molten material, or a resin compact. The green compact is obtained by pressure-molding raw material powder. The sintered body is obtained by sintering the green compact. The molten material is obtained by solidifying a molten raw material. The resin molded body is obtained by solidifying a melted resin. The shape of workpiece 10 may be, for example, a simple shape such as a single plate-like body or columnar body, or a complex shape such as a combination of a plurality of plate-like bodies and columnar bodies.

Figure 2:
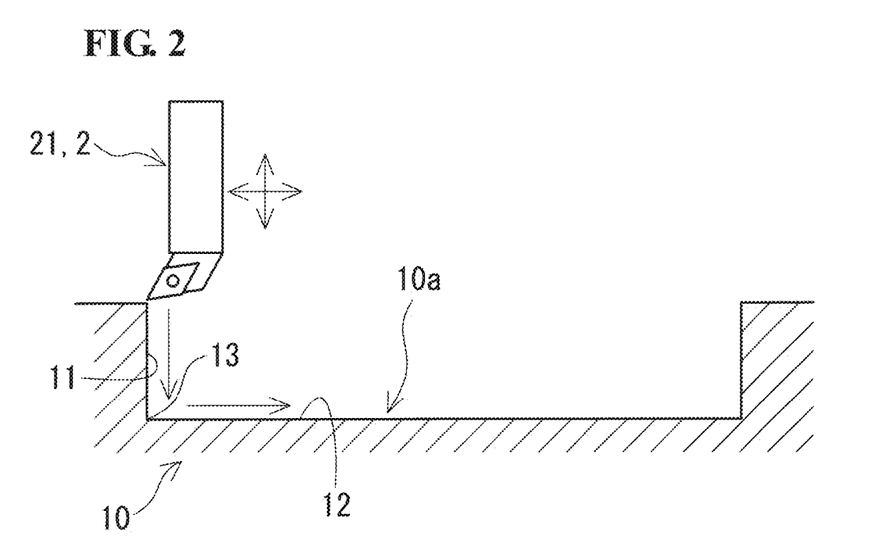
FIG. 2 is an explanatory diagram of a tool and a workpiece to be machined by the tool of the machining system of the embodiment.

Workpiece 10 of the embodiment of the present disclosure is a metallic sintered body. Workpiece 10 of the embodiment of the present disclosure has a recess 10*a*. As shown in FIG. 2, recess 10*a* includes a wall surface 11, a bottom surface 12, and a corner 13. Corner 13 connects wall surface 11 and bottom surface 12. In an embodiment of the present disclosure, wall surface 11 and bottom surface 12 within recess 10*a* are finish machining with tool 2. Unlike the embodiment of the present disclosure, recess 10*a* may be roughened.

[Tool]

Tool 2 machines workpiece 10. The type of tool 2 can be appropriately selected according to the type of machining. The type of machining is, for example, turning or milling. In the case of turning, the type of tool 2 is a turning tool. The turning tool is, for example, a cutting tool. In the case of milling, the type of tool 2 is a rotating tool. Examples of the rotary tool include a drill, a reamer, a tap, an end mill, a side cutter, a T-slot cutter, and a hob cutter.

Tool 2 is attached to a machine tool. In the case of turning, the machine tool is, for example, multi-spindle lathe. The multi-spindle lathe is, for example, a parallel twin-spindle lathe or an opposed twin-spindle lathe. In the case of milling, the machine tool is, for example, a machining center. The machine tool may be a combined machine tool capable of both turning and milling. Publicly known multi-spindle lathes and machining centers can be used as the multi-axis lathes and machining centers.

The machine tool of the embodiment of the present disclosure is a parallel twin-spindle lathe as shown in FIG. 1. The parallel twin-spindle lathe is a lathe in which a first main shaft 101 and a second main shaft 102 are parallel. The parallel twin-spindle lathe includes first main shaft 101 and second main shaft 102, a first chuck 111 and a second chuck 112, a first turret and a second turret, and a transfer machine. The first turret, the second turret and the transfer machine are not shown.

First chuck 111 is attached to the tip of first main shaft 101. Second chuck 112 is attached to the tip of second main shaft 102. First chuck 111 and second chuck 112 hold workpiece 10. A first tool 21 is attached to the first turret. A second tool 22 is attached to the second turret. First tool 21 machines workpiece 10 held by first chuck 111. Second tool 22 machines workpiece 10 held by second chuck 112. First tool 21 and second tool 22 can be appropriately selected in accordance with the type of machining as described above. First tool 21 and second tool 22 may be the same or different. In an embodiment of the present disclosure, first tool 21 and second tool 22 are the same indexable type cutting tools as shown in FIG. 1. First tool 21 and second tool 22 perform finish machining on the same machining condition in the range corresponding to each other of different workpiece 10. First main shaft 101 and second main shaft 102, first chuck 111 and second chuck 112, and the first turret and the second turret have the same configuration. The following description will be made with respect to first main shaft 101, first chuck 111 and the first turret as representative examples.

First main shaft 101 is rotated by a first motor 31 which will be described later. As first main shaft 101 rotates, workpiece 10 held by first chuck 111 rotates. First main shaft 101 is moved forward and backward by a drive mechanism (not shown) as indicated by the vertical arrow in FIG. 1. By means of this drive mechanism, first main shaft 101 may also move horizontally as indicated by the left-right arrow in FIG. 1. The first turret is moved forward and backward by a drive mechanism (not shown) as indicated by the vertical arrow in FIG. 1. By means of this drive mechanism, the first turret may also be moved horizontally as indicated by the left-right arrow in FIG. 1. Advancing means bringing workpiece 10 and tool 2 closer to each other. Retraction means moving workpiece 10 and tool 2 away from each other. The horizontal movement means movement in a direction orthogonal to the forward direction and the backward direction.

The transfer machine transfers workpiece 10 from the outside of the parallel twin-spindle lathe to each of first chuck 111 and second chuck 112 and transfers workpiece 10 from each of first chuck 111 and second chuck 112 to the outside of the parallel twin-spindle lathe. The number of transfer machines may be plural. The number of transfer machines may be, for example, two: a first transfer machine and a second transfer machine. The first transfer machine transfers workpiece 10 from the outside of the parallel twin-spindle lathe to first chuck 111 and from first chuck 111 to the outside of the parallel twin-spindle lathe. The second transfer machine transfers workpiece 10 from the outside of the parallel twin-spindle lathe to second chuck 112 and from second chuck 112 to the outside of the parallel twin-spindle lathe.

The machining flow of workpiece 10 by first tool 21 is as follows. Workpiece 10 is transferred from the outside of the parallel twin-spindle lathe to first chuck 111 and held by the transfer machine. When workpiece 10 is held by first chuck 111, first main shaft 101 is rotated by motor 3. This rotation causes workpiece 10 held by first chuck 111 to rotate. Rotating workpiece 10 and first tool 21 approach each other, and recess 10*a* of workpiece 10 is machined by first tool 21. Workpiece 10 machined by first tool 21 is removed from first chuck 111 by the transfer machine. Removed workpiece 10 is transferred to the outside of the parallel twin-spindle lathe by a transfer machine. The flow of machining of workpiece 10 by second tool 22 is the same as the flow of machining of workpiece 10 by first tool 21 described above. Machining of workpiece 10 held by first chuck 111 and machining of workpiece 10 held by second chuck 112 are performed substantially simultaneously. Each of the machining of workpiece 10 by first tool 21 and the machining of workpiece 10 by second tool 22 is repeated. Thus, a plurality of workpieces 10 are sequentially machined by each of first tool 21 and second tool 22.

[Motor]

Motor 3 is a main shaft motor for rotating workpiece 10 or tool 2. In the case of turning as in the embodiment of the present disclosure, motor 3 rotates workpiece 10 via a chuck 110 by rotating a main shaft 100 as described above. When the machine tool is parallel twin-spindle lathe as in the embodiment of the present disclosure, the number of motor 3 is two, i.e., first motor 31 and a second motor 32. First motor 31 rotates first main shaft 101. Second motor 32 rotates second main shaft 102. In FIG. 1, a two dot chain line connecting first motor 31 and first main shaft 101 and a two dot chain line connecting second motor 32 and second main shaft 102 virtually indicate rotation axes of respective main shafts 100 rotated by respective motors 3. Workpiece 10 rotates about the rotation axis. Unlike the embodiment of the present disclosure, in the case of milling, motor 3 rotates tool 2.

[Measurement Device]

Measurement device 4 acquires the load current of motor 3. Measurement device 4 is, for example, a current sensor. When the machine tool is a parallel twin-spindle lathe as in the embodiment of the present disclosure, the number of measurement devices 4 is two, that is, a first measurement device 41 and a second measurement device 42. First measurement device 41 acquires the load current of first motor 31. Second measurement device 42 acquires the load current of second motor 32. That is, the load currents measured by first measurement device 41 and second measurement device 42 are independent of each other without being affected by each other.

[Controller]

Controller 5 controls motor 3. Controller 5 changes the rotational speed of motor 3. The rotational speed of motor 3 is set to a rotational speed corresponding to the machining condition prior to machining of workpiece 10. The change in the rotational speed of motor 3 is typically based on whether the MD value of workpiece 10 currently being machined exceeds a threshold. The MD value of workpiece 10 currently being machined will be discussed below. When the machine tool is a parallel twin-spindle lathe as in the embodiment of the present disclosure, controller 5 controls first motor 31 and second motor 32 individually. Here, first tool 21 and the second tool 22 perform finish machining on the same machining condition in the range corresponding to each other of different work piece 10. That is, the basic control procedure is common between the control of first motor 31 by controller 5 and the control of second motor 32 by controller 5. Therefore, the following description will be made on a case where controller 5 controls first motor 31 as a representative. Controller 5 further controls the operation of the drive mechanism of first main shaft 101, the drive mechanism of second main shaft 102, the drive mechanism of the first turret, the drive mechanism of the second turret, and the transfer machine.

Controller 5 is typically constituted by a computer. The computer includes, for example, a processor and a memory. The memory stores a program for causing the processor to execute a control procedure to be described later. The processor reads and executes the program stored in the memory. The program includes a program code related to a process of determining whether or not the calculation result of a calculation unit 52 exceeds the threshold, and a process of changing the rotational speed of motor 3 based on the determination. Controller 5 includes a storage unit 51 and calculation unit 52.

[Storage Unit]

Storage unit 51 stores the threshold. The threshold is a value set in advance as follows, for example.

A plurality of non-defective products are produced by machining workpieces 10 with normal, undamaged tool 2. As the number of non-defective products increases, the reliability of the threshold tends to increase. The number of non-defective products depends on the type of machined product, and may be, for example, 500 or more, further 650 or more, particularly 800 or more. The load current of motor 3 is acquired when each non-defective product is manufactured.

A unit space in the MT (Mahalanobis-Taguchi) method is created. To create the unit space, a parameter based on the load current of motor 3 acquired when a plurality of non-defective products are manufactured is used. The parameter may be referred to as a monitoring target or a feature amount in the MT method. The load current uses the specific machining range of workpiece 10 obtained during machining.

The specific machining range is a predetermined range in which workpiece 10 is continuously machined by first tool 21. For example, in workpiece 10 having recess 10*a* shown in FIG. 2, the blade portion of first tool 21 may act on only wall surface 11, only bottom surface 12, or both wall surface 11 and bottom surface 12 at the same time. The reason why the blade portion of tool 2 acts on both wall surface 11 and bottom surface 12 at the same time is that corner 13 constituted by wall surface 11 and bottom surface 12 is machined. The specific machining range may be a range constituting wall surface 11, a range constituting bottom surface 12, a range constituting corner 13, or the like.

Figure 3:
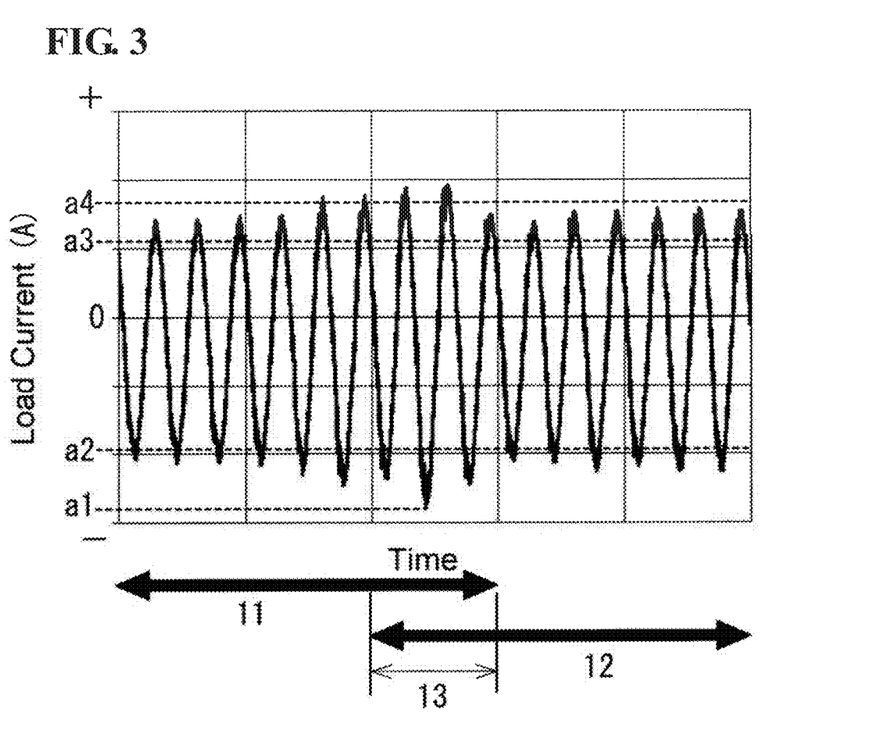
FIG. 3 is a graph showing the waveform of the load current of the motor obtained by the machining system of the embodiment.

The specific machining range may be a range including a place where the machining condition by first tool 21 changes. The machining condition by tool 2 is, for example, a feed amount and a cutting amount of a blade portion of first tool 21, a rotational speed of first tool 21 or workpiece 10, a feed direction, and a machining time. For example, in workpiece 10 having recess 10*a*, the specific machining range is a range constituting corner 13. The range constituting corner 13 is a range including corner 13 and the vicinity of corner 13. The vicinity includes both wall surface 11 and bottom surface 12. When corner 13 is machined, the feed direction of the blade portion of first tool 21 changes from wall surface 11 toward bottom surface 12. When the feed direction is changed in this manner, the contact portion of the blade portion of first tool 21 with workpiece 10 is changed. Specifically, when corner 13 is machined, the blade portion of first tool 21 acts on both wall surface 11 and bottom surface 12 at the same time. In the range in which corner 13 is formed, the machining resistance of first tool 21 increases. FIG. 3 is a graph showing the waveform of the load current of motor 3 obtained by measurement device 4 when wall surface 11, corner 13, and bottom surface 12 are sequentially processed. In this graph, the horizontal axis represents time and the vertical axis represents load current. A thick arrow indicating a region where wall surface 11 is machined and a thick arrow indicating a region where bottom surface 12 is machined are provided along the horizontal axis. The thick arrows partially overlap. A thin arrow indicating a region where corner 13 is machined is attached to a region where both thick arrows overlap each other. + (plus) on the vertical axis of this graph indicates positive, and − (minus) indicates negative. As the machining resistance of first tool 21 for machining corner 13 is increased, the load current at corner 13 has a waveform larger than the load current at wall surface 11 and bottom surface 12 as shown in FIG. 3.

The parameter based on the load current includes a parameter obtained by performing Fourier transform on the load current and a measured value of the load current. The parameter obtained by Fourier transform on the load current may be appropriately selected according to, for example, the type of machining and machining conditions. When the parameter obtained by Fourier-transforming the load current is, for example, a parameter focusing on a certain frequency band of the Fourier spectrum, the frequency band can be appropriately selected according to the rotation speed of motor 3.

The parameter obtained by Fourier-transforming the load current includes, for example, an effective value of a value obtained by Fourier-transforming the load current, an amplitude value of a peak in a Fourier spectrum obtained by Fourier-transforming the load current, a center of gravity of the amplitude of the peak, and a center of gravity of the amplitude of the peak in a specific frequency range of the Fourier spectrum. The effective value of the Fourier transformed value is the root mean square of the Fourier transformed value. The peak of the Fourier spectrum refers to the entire mountain-shaped curve including the maximum amplitude value. The amplitude value of the peak in the Fourier spectrum is the maximum amplitude value in the curve. The center of gravity of the amplitude of the peak in the Fourier spectrum is the amplitude value of the center of gravity at the bottom of the curve. The center of gravity of the amplitude of the peak in a particular frequency range is the amplitude value of the center of gravity at the bottom of the curve in the particular frequency range.

Figure 4:
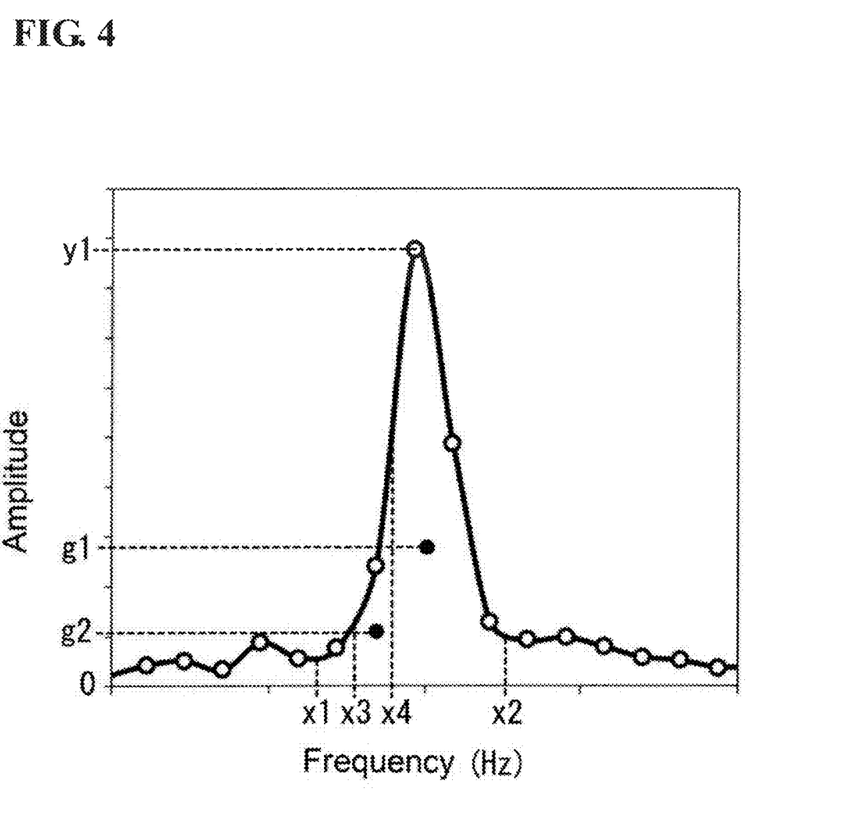
FIG. 4 is a graph showing a waveform of a Fourier spectrum obtained by Fourier-transforming a load current of a motor acquired by the machining system of the embodiment.

FIG. 4 is a graph showing the waveform of the Fourier spectrum obtained by Fourier-transforming the load current. The Fourier spectrum graph of FIG. 4 is a graph obtained by Fourier-transforming the load current of FIG. 3. In the graph of FIG. 4, the horizontal axis represents frequency and the vertical axis represents amplitude. The peak in the graph of FIG. 4 refers to the entire mountain-shaped curve in the range from the inflection point x1 to the inflection point x2. In FIG. 4, the amplitude value of the peak is the amplitude value y1 which is the maximum value of the amplitude values in the range from the inflection point x1 to the inflection point x2. In FIG. 4, the center of gravity of the peak amplitude is the amplitude value g1 of the center of gravity at the bottom of the curve in the range from the inflection point x1 to the inflection point x2. That is, the center of gravity of the amplitude of the peak is an amplitude value g1 of a center of gravity of an area surrounded by the horizontal axis, a straight line from the inflection point x1 along the vertical axis, a straight line from the inflection point x2 along the vertical axis, and a curve in a range from the inflection point x1 to the inflection point x2. In FIG. 4, for example, the center of gravity of the amplitude of the peak in the specific range of frequencies from x3 to x4 is the amplitude value g2 of the center of gravity at the bottom of the curve in the range from x3 to x4. That is, the center of gravity of the amplitude of the peak in the range from x3 to x4 is the amplitude value g2 of the center of gravity of the area surrounded by the horizontal axis, the straight line from the inflection point x3 along the vertical axis, the straight line from the inflection point x4 along the vertical axis, and the curve in the range from x3 to x4.

The measured value of the load current includes, for example, a maximum value of the load current and an effective value of the load current. The maximum value of the load current is a value having the largest absolute value of the load current. The effective value of the load current is a value obtained by dividing the maximum value by the square root of 2. In FIG. 3, the maximum value of load current is the current value a1. In FIG. 3, the effective value of load current is the current value a2.

The number of parameters can be appropriately selected in accordance with the level of detection accuracy, specifically, the probability of chi-square distribution described later. In the embodiment of the present disclosure, the number of parameters is seven from the first parameter to the seventh parameter. The first parameter to the fifth parameter are parameters obtained by performing Fourier transform on the load current. The sixth parameter and the seventh parameter are measured values of the load current.

Specifically, the first parameter is an effective value of a Fourier-transformed value of the load current. The second parameter is an amplitude of a peak in a Fourier spectrum obtained by Fourier-transforming the load current. The third parameter is the center of gravity of the amplitude of the peak in the Fourier spectrum. The fourth parameter is the center of gravity of the amplitude of the peak at the 28 Hz to 30 Hz of the Fourier spectrum. The fifth parameter is the center of gravity of the amplitude of the peak at the 31 Hz to 33 Hz of the Fourier spectrum. The sixth parameter is the maximum value of the load current. The seventh parameter is the effective value of the load current. The Fast Fourier transform can be used as the Fourier transform. Fast Fourier transform is an algorithm for calculating discrete Fourier transform at high speed. That is, the calculation time of the Fast Fourier transform is short.

The MD value of each non-defective product is obtained using the created unit space. Then, the square root of the chi-square distribution of the MD value of the non-defective product is obtained. This is because the square of the MD value follows chi-square distribution. The probability of chi-square distribution can be appropriately selected in accordance with, for example, the number of machined products produced per month. This probability is, for example, greater than $\{1-(1/N)\}$ when the number of machined products produced per month is N. The probability is, for example, greater than or equal to $\{1-(1/1.5\,N)\}$, further greater than or equal to $\{1-(1/2\,N)\}$, in particular greater than or equal to $\{1-(1/2.5\,N)\}$. This probability is, for example, $\{1-(1/1000000)\}$, i.e. 0.999999. The degree of freedom of chi-square distribution is assumed to be "n−1". n is the number of parameters. Since the number of parameters in the embodiment of the present disclosure is seven, the degree of freedom is six. If the probability is 0.999999 and the degree of freedom is 6, then the square root of the chi-square distribution is 6.2. This value is a value rounded off to the second decimal place. The value of the square root of the obtained chi-square distribution is defined as the threshold. In this case, statistically, 99.9999% of the MD value of the non-defective product means that it is equal to or less than the threshold. That is, when the MD value exceeds the threshold, it may be determined that the machined product having the MD value is a defective product.

[Calculation Unit]

Calculation unit 52 calculates the MD value of workpiece 10 currently being machined. The MD value is a value obtained by using a parameter based on the load current acquired by first measurement device 41 while machining the specific machining range of workpiece 10 currently being machined. The specific machining range is as described above. As described above, at a place where the machining condition by first tool 21 changes, a unique change occurs in the load current acquired by first measurement device 41. By focusing on the specific change, it is easy to determine whether or not the MD value exceeds the threshold. The parameter based on the load current is the same as the parameter used when setting the threshold described above. That is, the parameter based on the load current includes the parameter obtained by performing Fourier transform on the load current and the measured value of the load current. In the embodiment of the present disclosure, the MD value is the value determined using the first to seventh parameters described above. The Fast Fourier transform can be used as the Fourier transform when calculating the MD value. As described above, the calculation time of the Fast Fourier transform is short. Therefore, it is possible to determine whether a non-defective product or a defective product is produced substantially in real time during the machining of workpiece 10. The calculation result may be stored in storage unit 51.

When the calculated MD value exceeds the threshold, controller 5 sets the rotational speed of first motor 31 to zero. When the rotational speed of first motor 31 reaches zero, the rotation of workpiece 10 stops in the embodiment of the present disclosure. If the calculated MD value exceeds the threshold, a defective product has been produced. That is, workpiece 10 is being machined by damaged first tool 21. When controller 5 sets the rotational speed of first motor 31 to zero, the rotation of workpiece 10 is stopped. Therefore, after the rotation is stopped, workpiece 10 is not machined by damaged first tool 21. Therefore, it is possible to prevent the defective product which is not subjected to the predetermined machining from being continuously produced.

When the calculated MD value is equal to or less than the threshold value, controller 5 does not change the rotational speed of first motor 31. In this case, next workpiece 10 is machined by first tool 21 that has machined the immediately preceding workpiece 10 while first motor 31 rotates at the same rotational speed as the immediately preceding workpiece 10.

[Control Procedure]

Figure 5:
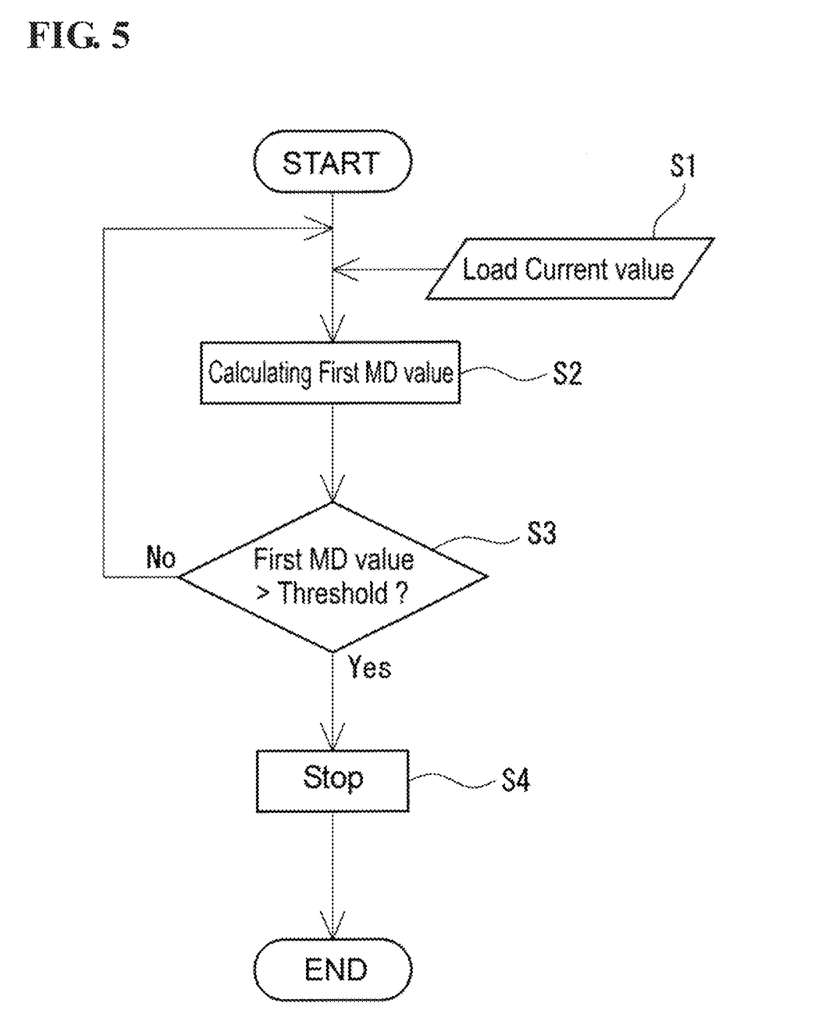
FIG. 5 is a flowchart showing a processing procedure of the controller in the machining system of the embodiment.

A control procedure by controller 5 will be described with reference to FIG. 5.

Workpiece 10 is rotated by motor 3, and workpiece 10 is machined by first tool 21.

In step S1, first measurement device 41 acquires the load current of first motor 31.

In step S2, calculation unit 52 calculates the MD value of workpiece 10 currently being machined. The MD value is obtained using the first parameter to the seventh parameter based on the acquired load current. Here, load current acquired during machining in the specific machining range of workpiece 10 currently being machined is used. In the embodiment of the present disclosure, the specific machining range is a range including a place where the machining condition by tool 2 described above changes, that is, a range constituting corner 13.

In step S3, it is determined whether or not the calculated MD value exceeds the threshold. In an embodiment of the present disclosure, the Fourier transform in computing the MD value is the Fast Fourier transform.

When the step S3 is exceeds the threshold, controller 5 sets the rotational speed of first motor 31 to zero in the step S4. Then, the control is ended. The case when the step S3 exceeds the threshold is a case when a defective product is produced. That is, the case when the value exceeds the threshold value refers to a case when workpiece 10 is machined by damaged first tool 21.

When the determination in step S3 is negative, controller 5 does not change the rotational speed of first motor 31. The case when the determination in step S3 is negative is a case when a non-defective product is produced. That is, the case when workpiece 10 is machined by normal first tool 21 which is not damaged. Therefore, the next workpiece is machined by first tool 21 that machined the immediately preceding workpiece 10 at the same rotational speed of first motor 31 as the immediately preceding workpiece 10. Then, machining of next workpiece 10 and steps S1 to S3 are repeated until it is determined that the MD value exceeds the threshold.

In machining system 1 according to the embodiment of the present disclosure, when the MD value exceeds the threshold value, that is, when the defective product is produced, the rotational speed of motor 3 can be immediately set to zero, and thus the production of the defective product can be suppressed. In particular, since machining system 1 according to the embodiment of the present disclosure uses the MD value calculated using the first parameter to the seventh parameter based on the load current of motor 3 to determine whether or not the defective product is produced, it is possible to appropriately determine whether or not the defective product is produced even in using a multi-spindle lathe.

[Method of Manufacturing a Machined Product]

A method of manufacturing a machined product of an embodiment sequentially machines a plurality of workpieces with a tool. The machining of the embodiment of the present disclosure is a finish machining. Unlike the embodiment of the present disclosure, the machining may be roughing. Hereinafter, the machining will be described in detail.

[Machining]

The machining is performed while measuring a load current of a motor rotating the tool or the workpiece with a measurement device. In the machining, when the MD value exceeds the threshold value, the rotational speed of the motor is changed. Specifically, when the MD value exceeds the threshold value, the rotational speed of the motor is set to zero. As described above, the MD value is obtained using the first to seventh parameter based on the load current acquired by the measurement device while the specific machining range is being machined in the currently machined workpiece.

When the motor stops rotating, the damaged tool is replaced with a new tool. Once the new tool is replaced, machining of the next workpiece is repeated until the MD value is above the threshold. On the other hand, when the MD value is equal to or less than the threshold value, the rotational speed of the motor is not changed. The next workpiece is then machined by the tool that machined the previous workpiece at the same rotational speed as the rotational speed of the previous workpiece. Then, machining of the next workpiece is then repeated until the MD value exceeds the threshold.

In the method of manufacturing a machined product of the embodiment of the present disclosure, similarly to machining system 1, when the MD value exceeds the threshold, that is, when a defective product is produced, the rotational speed of the motor can be immediately set to zero, and thus the production of the defective product can be suppressed.

[Modification 1]

Figure 6:
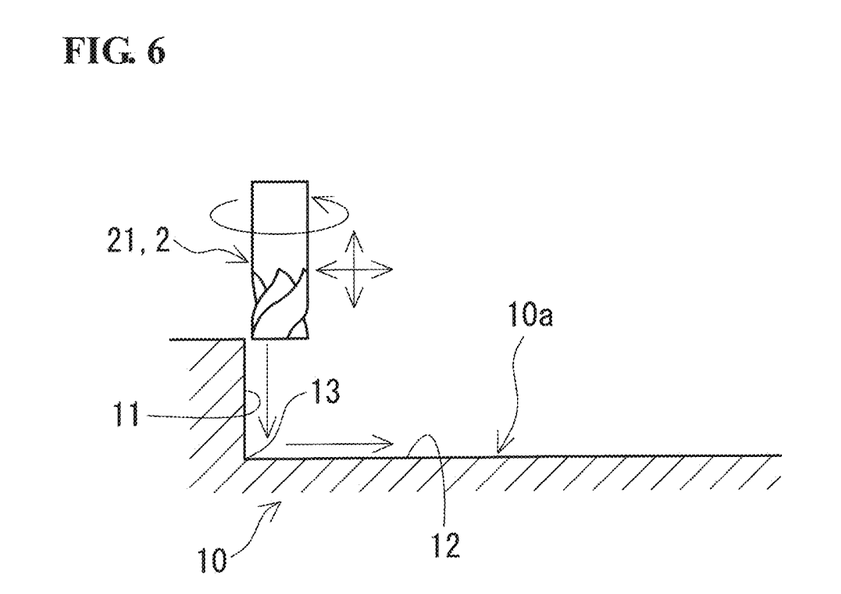
FIG. 6 is an explanatory diagram showing a tool provided in the machining system of modification 1 and a workpiece machined by the tool.

As shown in FIG. 6, the machining system of modification 1 differs from machining system 1 of the above-described embodiment in that the type of machining is milling. Other configurations are the same as those of machining system 1 of the embodiment. The following description will focus on the differences. Description of the same configuration is omitted. This also applies to modification 2 to be described later. The milling is, for example, milling. First tool 21 is rotated by a first motor (not shown). First tool 21 of the present example is an end mill. First tool 21 is moved forward, backward, and horizontally by the drive mechanism as indicated by the vertical and horizontal arrows in FIG. 6. Also in this machining system, when the MD value based on the load current of the first motor that rotates first tool 21 exceeds the threshold, the rotation of the first motor should be stopped.

[Modification 2]

Figure 7:
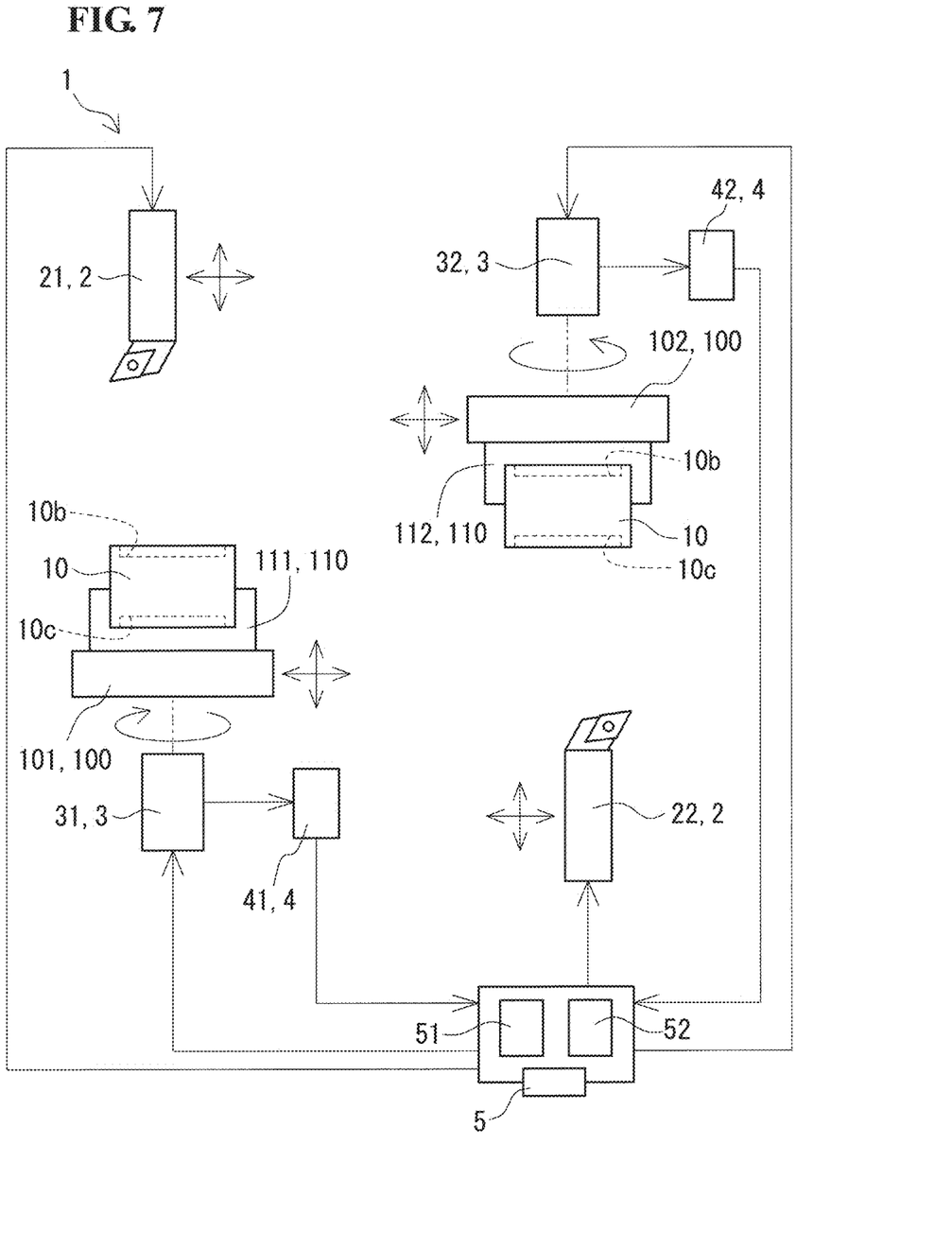
FIG. 7 is an explanatory diagram showing a machining system of modification 2.

As shown in FIG. 7, machining system 1 of modification 2 is different from machining system 1 of the above-described embodiment in that the machine tool is an opposed twin-spindle lathe.

The opposed twin-spindle lathe is a lathe in which first main shaft 101 and second main shaft 102 face each other. In this example, the rotation axis of first main shaft 101 and the rotation axis of second main shaft 102 are offset from each other. In this example, first tool 21 and second tool 22 perform the same finish machining on different areas of workpiece 10.

In this example, the transfer machine transfers workpiece 10 from the outside of the opposed twin-spindle lathe to first chuck 111, from first chuck 111 to second chuck 112, and from second chuck 112 to the outside of the opposed twin-spindle lathe.

The machining flow of workpiece 10 is as follows. Workpiece 10 is transferred to and held by first chuck 111 from the outside of the opposed twin-spindle lathe by a transfer machine. When workpiece 10 is held by first chuck 111, first main shaft 101 is rotated by motor 3. This rotation causes workpiece 10 held by first chuck 111 to rotate. Rotating workpiece 10 and first tool 21 approach each other, and a first recess 10b of workpiece 10 is machined by first tool 21. First recess 10b is the same as recess 10a described in the embodiment.

Workpiece 10 machined by first tool 21 is removed from first chuck 111 by the transfer machine. Removed workpiece 10 is transferred to and held by second chuck 112 by the transfer machine. Thereafter, a second recess 10c of workpiece 10 held by second chuck 112 is machined by second tool 22 in the same manner as the machining of first recess 10b of workpiece 10 described above. Second recess 10c is the opposite recess to first recess 10b in workpiece 10. Second recess 10c is the same as first recess 10b. Workpiece 10 machined by second tool 22 is removed from second chuck 112 by the transfer machine and transferred to the outside of the opposed twin-spindle lathe.

During workpiece 10 machined by first tool 21 is removed from first chuck 111 by the transfer machine and before workpiece 10 is machined by second tool 22, next workpiece 10 is transferred to and held by first chuck 111 by the transfer machine. Then, machining of workpiece 10 held by first chuck 111 and machining of workpiece 10 held by second chuck 112 are performed substantially simultaneously. By repeating these operations, a plurality of workpieces 10 are sequentially machined.

In this machining system 1 as well, the rotation of first motor 31 may be stopped when the MD value based on the load current of first motor 31 that rotates first tool 21 exceeds the threshold.

[Trial Example]

The threshold was determined as follows. The workpiece was machined with an undamaged normal tool to produce a plurality of non-defective products. Here, the number of non-defective products was 800 to 850. While the specific machining range of each workpiece was machined, the load current of the motor was acquired by the measurement device. The specific machining range was a range constituting the corner above-mentioned. In creating the unit space, 31 parameters based on the load current were selected.

The first parameter is an effective value of a fast Fourier transformed value of the load current.

The second parameter is an amplitude value of a peak in a Fourier spectrum obtained by Fast Fourier-transforming the load current.

The third parameter is a crest factor in the Fourier spectrum. The crest factor is a ratio of the amplitude value of the peak to the effective value (the amplitude value of the peak/the effective value).

The fourth parameter is the center of gravity of the amplitude of the peak in the Fourier spectrum.

The fifth parameter is the center of gravity of the amplitude of the peak at 10 Hz to 15 Hz of the Fourier spectrum.

The sixth parameter is the center of gravity of the amplitude of the peak at 15 Hz to 20 Hz of the Fourier spectrum.

The seventh parameter is the center of gravity of the amplitude of the peak at 22 Hz to 24 Hz of the Fourier spectrum.

The eighth parameter is the center of gravity of the amplitude of the peak at 25 Hz to 27 Hz of the Fourier spectrum.

The ninth parameter is the center of gravity of the amplitude of the peak at 28 Hz to 30 Hz of the Fourier spectrum.

The tenth parameter is the center of gravity of the amplitude of the peak at 31 Hz to 33 Hz of the Fourier spectrum.

The eleventh parameter is the center of gravity of the amplitude of the peak at 34 Hz to 36 Hz of the Fourier spectrum.

The twelfth parameter is the center of gravity of the amplitude of the peak at 37 Hz to 39 Hz of the Fourier spectrum.

The thirteenth parameter is the center of gravity of the amplitude of the peak at 40 Hz to 42 Hz of the Fourier spectrum.

The fourteenth parameter is the center of gravity of the amplitude of the peak at 79 Hz to 93 Hz of the Fourier spectrum.

The fifteenth parameter is the maximum value of the load current.

The sixteenth parameter is the minimum value of the load current.

The seventeenth parameter is the effective value of the load current.

The eighteenth parameter is a skewness of the load current. The skewness is an index indicating the left-right symmetry of the histogram of the load current, and is a value indicating how much the histogram of the load current deviates from the normal distribution.

The nineteenth parameter is the kurtosis of the load current. The kurtosis is an index indicating the degree of kurtosis of the peak of the histogram of the load current and the degree of spread of the tail, and is a value indicating how sharp the histogram of the load current is with respect to the normal distribution.

The twentieth parameter is abundance 1 of the load current.

The twenty first parameter is abundance 2 of the load current.

The twenty second parameter is abundance 3 of the load current.

The twenty third parameter is abundance 4 of the load current.

The twenty fourth parameter is abundance 5 of the load current.

The twenty fifth parameter is abundance 6 of the load current.

The twenty sixth parameter is variation 1 of the load current.

The twenty seventh parameter is variation 2 of the load current.

The twenty eighth parameter is variation 3 of the load current.

The twenty ninth parameter is variation 4 of the load current.

The thirtieth parameter is variation 5 of the load current.

The thirty first parameter is variation 6 of the load current.

The abundance is the number of data points at which the load current exceeds a certain value during the machining time of the specific machining range. For example, when the load current changes as 7.2 A, 7.4 A, 7.6 A, 7.4 A, 7.2 A, and a certain value is 7.5 A, the number of data points is one. The number of data points is the total number of data per workpiece. For example, in FIG. 3, it is assumed that the time during which the specific machining range is machined is the time from the left end to the right end of the graph. When a certain value is the current value a3, the number of data points is 15. When a certain value is the current value a4, the number of points is four. The abundance 1 is the number of data points at which the load current exceeds 7.5 A. The abundance 2 is the number of data points at which the load current exceeds 8 A. The abundance 3 is the number of data points at which the load current exceeds 8.5 A. The abundance 4 is the number of data points at which the load current exceeds 9.0 A. The abundance 5 is the number of data points at which the load current exceeds 9.5 A. The abundance 6 is the number of workpieces data points at which the load current exceeds 10 A. That is, the abundance 1 includes the abundance 2 to the abundance 6. Similarly, the abundance 2 includes the abundance 3 to the abundance 6. The abundance 3 includes the abundance 4 to the abundance 6. The abundance 5 includes the abundance 6.

The variation is the number of times the load current crosses a certain value during the machining time of the specific machining range. For example, the number of the load current changes from less than 7.5 A to more than 7.5 A and the number of the load current changes from more than 7.5 A to less than 7.5 A are each counted as one time. That is, as described above, when the load current shifts like 7.2 A, 7.4 A, 7.6 A, 7.4 A, and 7.2 A and the load current exceeds 7.5 A by one point, the number of the load current crosses 7.5 A is two. For example, in FIG. 3, it is assumed that the time during which the specific machining range is machined is the time from the left end to the right end of the graph. When the certain value is the current value a3, the crossing number of time is 30 times. When a certain value is the current value a4, the crossing number of time is eight times. The variation 1 is the crossing number of time of the load current crosses 7.5 A. The variation 2 is the crossing number of time of the load current crosses 8 A. The variation 3 is the crossing number of time of the load current crosses 8.5 A. The variation 4 is the crossing number of time of the load current crosses 9 A. The variation 5 is the crossing number of time of the load current crosses 9.5 A. The variation 6 is the crossing number of time of the load current crosses 10 A.

Thirty one parameters were used to create a unit space in the MT method. Using the created unit space, the MD value of each non-defective product was obtained. Then, the square root of chi-square distribution of the MD value of the non-defective product was obtained. The probability of chi-square distribution was set to 0.999999. The degree of freedom of the chi-square distribution is 30. The square root of chi-square distribution obtained from this probability and the degree of freedom was 9.1. This value is a value rounded off to the second decimal place. This value was taken as the threshold.

By using one tool 850 to 900 workpieces were sequentially machined to produce a machined product. These machined products include non-defective products and defective products. The MD value of each machined product was obtained using the 31 parameters. The machined products were classified into machined products having an MD value less than or equal to a threshold and machined products having an MD value greater than the threshold. As a result, defective products were found among machined products having MD values equal to or less than the threshold. In addition, non-defective products were found among machined products having MD values exceeding the threshold.

Therefore, selection of parameters from 31 parameters, creation of a unit space, setting of a threshold, recalculation of an MD value using the selected parameters, and stratification of a machined product based on the threshold were repeated.

Specifically, the number of parameters was 14. Fourteen parameters were the first parameter, the second parameter, the fourth parameter, the fifth parameter, the seventh parameter, the ninth parameter, the tenth parameter, the fifteenth parameter, the seventeenth parameter, the twentieth parameter, the twenty first parameter, the twenty second parameter, the twenty fifth parameter, and the thirtieth parameter. Fourteen parameters were used to create a unit space, set a threshold, and classify machined products based on the threshold. The probability of chi-square distribution was set to 0.999999. The degree of freedom of the chi-square distribution is 13. The square root of chi-square distribution obtained from this probability and the degree of freedom was 7.3. This value is a value rounded off to the second decimal place. This value was taken as the threshold. Even when the classification was performed based on the threshold, the non-defective product and the defective product could not be accurately classified by the threshold as in the case of using 31 parameters.

Further, the number of parameters was seven. Seven parameters were the first parameter, the second parameter, the fourth parameter, the ninth parameter, the tenth parameter, the fifteenth parameter, and the seventeenth parameter. Seven parameters ware used to create a unit space, set a threshold, and stratify machined products based on the threshold. The probability of chi-square distribution was set to 0.999999. The degree of freedom of the chi-square distribution is 6. The square root of chi-square distribution obtained from this probability and the degree of freedom was 6.2. This value is a value rounded off to the second decimal place. This value was taken as the threshold. As a result of stratification based on this threshold, it was found that all machined products whose MD values satisfy the threshold or less are non-defective products, and all machined products whose MD values satisfy the threshold or more are defective products. That is, neither a defective product having an MD value equal to or less than the threshold nor a non-defective product having an MD value exceeding the threshold was found.

The present invention is not limited to these examples, but is defined by the scope of the claims, and is intended to include all modifications within the meaning and scope equivalent to the scope of the claims. For example, the machining system and method of manufacturing a machined product can be suitably used in the case of performing grooving.

REFERENCE SIGNS LIST 1 machining system
2 tool, 21 first tool, 22 second tool
3 motor, 31 first motor, 32 second motor
4 measurement device, 41 first measurement device, 42 second measurement device
5 controller, 51 storage unit, 52 calculation unit
10 workpiece
10a recess, 10b first recess, 10c second recess
11 wall surface, 12 bottom surface, 13 corner
100 main shaft, 101 first main shaft, 102 second main shaft
110 chuck, 111 first chuck, 112 second chuck

The invention claimed is:
1. A machining system comprising:
a tool configured to machine a workpiece;
a motor configured to rotate the tool or the workpiece;
a controller configured to control the motor; and a measurement device configured to acquire a load current of the motor, wherein the controller is configured to change a rotational speed of the motor when a Mahalanobis distance exceeds a threshold, the Mahalanobis distance is a value determined by using a parameter based on the load current acquired by the measurement device in a specific machining range of the workpiece, and the parameter based on the load current includes a parameter obtained by performing Fourier transform on the load current and a measured value of the load current.

2. The machining system according to claim 1, wherein the parameter obtained by performing Fourier transform on the load current includes
   an effective value of a value obtained by performing Fourier transform on the load current,
   an amplitude value of a peak in a Fourier spectrum obtained by performing Fourier transform on the load current,
   a center of gravity of an amplitude of the peak, and
   a center of gravity of an amplitude of a peak in a specific frequency range of the Fourier spectrum.

3. The machining system according to claim 1, wherein the measured value of the load current includes
   a maximum value of the load current, and
   an effective value of the load current.

4. The machining system according to claim 1, wherein the number of the parameter based on the load current is seven, including a first parameter, a second parameter, a third parameter, a fourth parameter, a fifth parameter, a sixth parameter, and a seventh parameter,
   the first parameter to the fifth parameter are parameters obtained by performing Fourier transform on the load current, and
   the sixth parameter and the seventh parameter are measured values of the load current.

5. The machining system according to claim 4, wherein the first parameter is an effective value of a value obtained by performing Fourier transform on the load current,
   the second parameter is an amplitude value of a peak in a Fourier spectrum obtained by performing Fourier transform on the load current,
   the third parameter is a center of gravity of an amplitude of the peak,
   the fourth parameter is a center of gravity of an amplitude of a peak in a range of 28 Hz to 30 Hz of the Fourier spectrum,
   the fifth parameter is a center of gravity of an amplitude of a peak in a range of 31 Hz to 33 Hz of the Fourier spectrum,
   the sixth parameter is a maximum value of the load current, and
   the seventh parameter is an effective value of the load current.

6. The machining system according to claim 1, wherein the specific machining range is a range including a portion where a machining condition using the tool changes.

7. The machining system according to claim 1, wherein the machining system has a multi-spindle lathe, and
   the tool is a turning tool equipped in the multi-spindle lathe.

8. A method of manufacturing a machined product, comprising
   machining a workpiece with a tool while rotating the tool or the workpiece by a motor and measuring a load current of the motor by a measurement device, wherein
   a rotational speed of the motor is changed in machining when a Mahalanobis distance exceeds a threshold,
   the Mahalanobis distance is a value determined by using a parameter based on the load current acquired by the measurement device in a specific machining range of the workpiece, and
   the parameter based on the load current includes a parameter obtained by performing Fourier transform on the load current and a measured value of the load current.

* * * * *